US012601614B2

(12) United States Patent (10) Patent No.: US 12,601,614 B2
Reill et al. (45) Date of Patent: Apr. 14, 2026

(54) 3D INPUT APPARATUS, MOBILE DEVICE AND 3D INPUT DEVICE

(71) Applicant: Deutsches Zentrum für Luft- und Raumfahrt e.V., Bonn (DE)

(72) Inventors: Josef Reill, Kaufering (DE); Armin Wedler, Munich (DE); Volker Senft, Seefeld (DE); Markus Breu, Alling (DE)

(73) Assignee: Deutsches Zentrum für Luft- und Raumfahrt e.V., Bonn (DE)

( * ) Notice: Subject to any disclaimer, the term of this patent is extended or adjusted under 35 U.S.C. 154(b) by 201 days.

(21) Appl. No.: 18/281,814

(22) PCT Filed: Mar. 18, 2022

(86) PCT No.: PCT/EP2022/057168

§ 371 (c)(1),
(2) Date: Sep. 13, 2023

(87) PCT Pub. No.: WO2022/195082

PCT Pub. Date: Sep. 22, 2022

(65) Prior Publication Data

US 2024/0167849 A1 May 23, 2024

(30) Foreign Application Priority Data

Mar. 18, 2021 (DE) ..................... 10 2021 106 698.0

(51) Int. Cl.
*G01D 5/14* (2006.01)
*G06F 3/0346* (2013.01)

(52) U.S. Cl.
CPC ........... *G01D 5/145* (2013.01); *G06F 3/0346* (2013.01)

(58) Field of Classification Search
CPC G01D 5/12; G01D 5/14; G01D 5/142; G01D 5/145; G01R 33/02; G01R 33/0206;
(Continued)

(56) References Cited

U.S. PATENT DOCUMENTS 4,785,180 A 11/1988 Dietrich et al.
5,477,143 A 12/1995 Wu
(Continued)

FOREIGN PATENT DOCUMENTS

CN 103026322 A 4/2013
DE 3611337 A1 10/1987
(Continued)

*Primary Examiner* — Huy Q Phan
*Assistant Examiner* — David B Frederiksen
(74) *Attorney, Agent, or Firm* — The Webb Law Firm

(57) ABSTRACT

A 3D input apparatus including a first object, a second object movable relative to the first object, and at least one sensor unit for detecting displacements and/or angular rotations of the objects relative to each other. Each sensor unit includes a magnetoresistive sensor, a magnetic field element, and a magnetic marker element. The magnetoresistive sensor and the magnetic field element of respectively one sensor unit are connected to one of the objects, and the marker element of said sensor unit is connected to the other object. For each sensor unit the magnetoresistive sensor of said sensor unit detects a magnetic field emitted by the magnetic field element of said sensor unit and influenced by the marker element of said sensor unit.

19 Claims, 14 Drawing Sheets

(58) Field of Classification Search
CPC ............ G01R 33/06; G01R 33/09–098; G06F 3/0346; G06F 3/03548; G06F 3/0362; G06F 3/0383
See application file for complete search history.

(56) References Cited

U.S. PATENT DOCUMENTS

| | | | | |
|---|---|---|---|---|
| 5,969,520 | A * | 10/1999 | Schottler | ................ G05G 9/047 |
| | | | | 324/207.2 |
| 8,674,932 | B2 * | 3/2014 | Armstrong | ............ A63F 13/285 |
| | | | | 348/734 |
| 11,402,924 | B2 | 8/2022 | Senft et al. | |
| 11,507,202 | B2 | 11/2022 | Senft et al. | |
| 2008/0202898 | A1 * | 8/2008 | Cheon | ................. H01H 25/041 |
| | | | | 200/18 |
| 2012/0215475 | A1 | 8/2012 | Rutledge et al. | |
| 2014/0028294 | A1 | 1/2014 | Granig et al. | |
| 2015/0253908 | A1 | 9/2015 | Go | |
| 2016/0306379 | A1 * | 10/2016 | Zils | .......................... G05G 5/08 |
| 2016/0334830 | A1 * | 11/2016 | Sirohiwala | ............ G01D 5/145 |
| 2017/0060268 | A1 | 3/2017 | Chiu et al. | |
| 2017/0277282 | A1 | 9/2017 | Go | |
| 2020/0073257 | A1 * | 3/2020 | Mirin | .................... H01L 23/544 |
| 2020/0192486 | A1 * | 6/2020 | Schoessler | ............. G06F 3/041 |
| 2020/0379501 | A1 | 12/2020 | Sirohiwala et al. | |

FOREIGN PATENT DOCUMENTS

| | | | | |
|---|---|---|---|---|
| DE | 19580095 | C2 | 2/1998 | |
| DE | 102004047770 | A1 | 4/2006 | |
| DE | 102017206025 | A1 | 10/2018 | |
| DE | 102017211994 | A1 | 1/2019 | |
| DE | 102018205159 | A1 | 10/2019 | |
| DE | 102018118477 | A1 | 2/2020 | |
| WO | WO-2019193130 | A1 * | 10/2019 | ........ G05G 9/04737 |

* cited by examiner

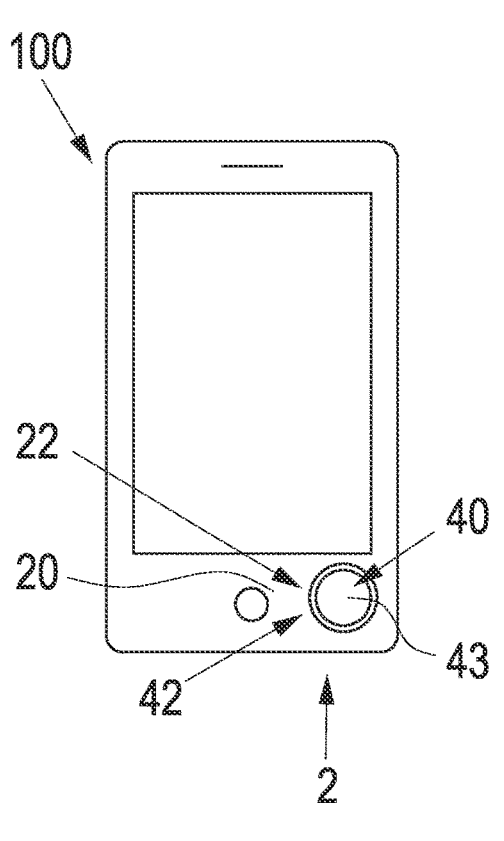
Fig. 9a
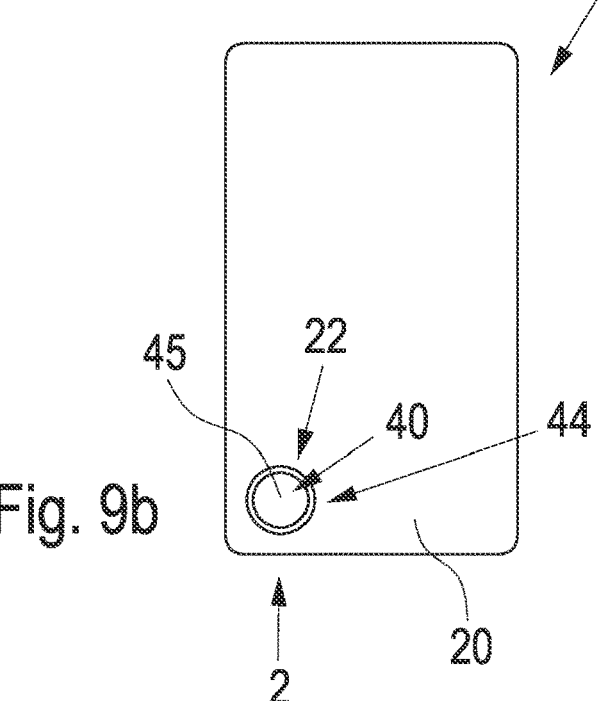
Fig. 9b
Fig. 9c

3D INPUT APPARATUS, MOBILE DEVICE AND 3D INPUT DEVICE

CROSS-REFERENCE TO RELATED APPLICATIONS

This application is the United States national phase of International Application No. PCT/EP2022/057168 filed Mar. 18, 2022, and claims priority to German Patent Application No. 10 2021 106 698.0 filed Mar. 18, 2021, the disclosures of which are hereby incorporated by reference in their entireties.

BACKGROUND OF THE INVENTION

Field of the Invention

The invention relates to a 3D input apparatus. The invention further relates to a 3D input device. Furthermore, the invention relates to a mobile device. 3D input apparatus or 3D input devices are particularly used to transfer three-dimensional inputs, e.g. three-dimensional movement commands, to a computer system.

For example, so-called 3D mice are used in 3D design software to move objects in a virtual 3D environment or to enable the user to maneuver through a virtual 3D landscape. Preferably, such input devices for creating 3D designs, also called CADs, are applied by means of IT software. Furthermore, 3D input devices may be used in joysticks, game consoles, data gloves, computer keyboards, computer mice, trackpads, touchpads, smartphones or remote controls. A further field of application for 3D input devices are remote controls for robots, e.g. for drones. 3D input devices are particularly characterized by the fact that they can be used to reproduce or input all relative movements and/or relative positions of two objects relative to each other. Such relative movements and/or relative positions can be described by means of six components, namely three displacements (X, Y, Z) and three angular rotations (A, B, C) in or about the three axes of the Cartesian coordinate system. For the reproduction or input of the six components, common 3D input devices have an input body that is movable to a fixed base body along the six components. Said relative movements and/or relative positions are sensed by means of a sensor device. In this way, virtual objects or robots, such as drones, can be moved along the six components in space.

Description of Related Art

Common 3D input devices are known from DE 36 11 337 A1 and US 2012/0215475 A1, among others.

Input devices according to prior art generally have the disadvantage that they are large and therefore not suitable for mobile or portable use.

DE 10 2017 206 025 A1 describes a magnetic arrangement and a 3D input device for movements between two objects in six degrees of freedom. Here, one-dimensional magnetoresistive sensors and magnets are used, which are arranged opposite each other on the two objects.

A technical disadvantage of the previous use of magnetoresistive sensor technologies—for example by means of AMR sensors—is the increased electrical effort required to determine the one-dimensional position of the magnet relative to the magnetic sensor. The AMR sensor itself generates its electrical measurement result in the form of two half-bridges and thus delivers four voltages. Two analogue voltages can be combined in advance to form one voltage.

Two voltages remain as the measurement result of the AMR sensor, representing the sine and cosine proportion of the result. These are typically read in by a microprocessor using an analogue-to-digital converter. The calculation of the arc tangent function results in the actual measurement result, the position of the magnet relative to its associated magnetoresistive sensor. This therefore results in a high level of effort. Furthermore, the design or construction of previous magnetic arrangements or 3D input devices is complex.

SUMMARY OF THE INVENTION

The object of the invention is to provide an optimized magnetic arrangement, an optimized 3D input device and an optimized mobile device.

The object of the invention is achieved with a magnetic arrangement as described herein, an optimized mobile device as described herein, and an optimized 3D input device as described herein.

The 3D input apparatus according to the invention is particularly an input apparatus for six components, namely three displacements and three angular rotations in or about the three axes of the Cartesian coordinate system. The 3D input apparatus comprises a first object and a second object. The objects are movable relative to each other. It is preferred that the first object and/or the second object comprises a circuit board, in particular consist thereof. Furthermore, the 3D input apparatus comprises at least one sensor unit to sense displacements and/or angular rotations of the objects relative to each other. Each sensor unit comprises a magnetoresistive sensor, at least one, in particular exactly one, magnetic field element and at least one, in particular exactly one, magnetic marker element. It is preferred that the at least one marker element is a ferromagnetic marker element. Thus, the marker element preferably comprises iron. The at least one marker element has any form, in particular a longitudinal or punctual form. The magnetoresistive sensor and the magnetic field element of respectively one sensor unit is connected to one of the objects. The marker element of said sensor unit is connected to the other object. The connection between sensor and/or magnetic field element and/or marker element and the respective object is in particular immovable, also to be described as rigid. A one-piece connection, also described as an integral connection, is also possible. Sensor and/or magnetic field element and/or marker element can preferably be embedded in the respective object, for example in a borehole. It is preferred that for each sensor unit the sensor and the magnetic field element of said sensor unit, which are connected to the one object, are arranged opposite the marker element of said sensor unit, which marker element is connected to the other object. For each sensor unit, the magnetoresistive sensor of said sensor unit detects a magnetic field emitted by the magnetic field element of said sensor unit and influenced and preferably focused by the marker element of said sensor unit. If the 3D input apparatus thus has several sensor units, it is preferably implemented for each of said sensor units that the magnetic field element of said sensor unit emits a magnetic field which is influenced by the marker element of said sensor unit and is preferably focused and sensed by the magnetoresistive sensor of said sensor unit. It is preferred that the magnetoresistive sensor is configured such that an angle of the magnetic field lines, in particular in the centre of the sensor, is measured in relation to a reference line during detection. It is preferred that for each sensor unit the marker element is configured and/or arranged such that the marker element focuses the magnetic field emitted by the magnetic field element of said sensor unit, in particular the magnetic field lines, onto said marker element. Preferred is an embodiment in which the marker element of each sensor unit focuses the magnetic field emitted by the magnetic field element of said sensor unit, in particular the magnetic field lines, with respect to the sensor of said sensor unit, wherein preferably the magnetic field, in particular the magnetic field lines, are focused onto the centre of the sensor of said sensor unit. Consequently, for each sensor unit, a corresponding design and/or relative arrangement to each other of the magnetic field and/or marker element and/or sensor is preferred, so that the magnetic field, in particular the magnetic field lines, are focused onto the marker element and, particularly preferred, onto the center of the sensor.

Magnetic field lines of a magnetic dipole are source-free, but have a direction from the north pole to the south pole of the magnet. The presence of a marker element, in particular consisting of ferromagnetic material, ensures that the magnetic field lines are focused onto said marker element. Depending on the position of the marker element, the course of the magnetic field line is changed accordingly. A magnetoresistive sensor detects this change. In particular, the sensor is located between the magnetic field element and the marker element. Preferably, the sensor measures the angle of the magnetic field line, in particular in the center of the sensor, relative to a reference line. In particular, the direction of the magnetic field line is only detected in one measuring plane of the sensor. Preferably, the perpendicular components are not measured. This is done by means of a one-dimensional sensor, in particular. The result of the measurement at the sensor is in particular an angle or value that is directly related to the position of the marker element in front of the sensor. The position is preferably only detected one-dimensionally along the sensor direction. Vertical movements of the marker element are preferably not recognized.

A reduction of the effort compared to prior art can be achieved in particular if the measuring range of the sensor is reduced. For sine and cosine functions, e.g. of the measurement result of AMR sensors, an approximately linear range of the sine function, e.g. around 0°, results depending on the angle. The AMR sensor provides a sine and a cosine value as the measurement result. For an angle around 0°, for example, the sine value provides approximately linear measurement values as a function of the measured angle. The sine function here is in the approximately linear range. In this range, the cosine function is at or near the maximum deflection, especially at or near 1. It thus does not make a significant contribution to the determination of the angle. All the information about the angle resulting from the arc tangent function is contained in the sine proportion of the result at this position. It is therefore sufficient to evaluate only this proportion. The simplification is also present in other areas of the sine and cosine function. This changes either the sign of the maximum deflection, the sign of the linear dependence and/or the role of the sine and cosine function.

To take advantage of this, it was found that the used measuring range of the sensor is reduced without limiting the real range of movement of the magnetic field element. Limiting the measuring range of the sensor means that only angles from the "linear range" can occur and no longer the complete measuring range from −180° to +180°. At the same time, however, a restriction of the real range of movement of the magnetic field element is undesirable. This means that the real movement of the magnetic field element should only result in a reduced change of the angle. The measured magnetic field vector should change only slightly due to the movement of the magnet. This was implemented by the embodiment according to the invention, wherein a sensor unit comprises a sensor, a magnetic field element and a marker element in a corresponding arrangement.

In particular, the effort required could thus be reduced to great advantage.

In particular, the invention results in the further advantage that the design and/or the construction of the 3D input apparatus is simplified. Furthermore, it is possible in a particularly advantageous manner to implement further miniaturisation. These advantages result, for example, from the fact that the sensor and magnetic field element are connected to one object and the marker element to the other object. Here, the marker element can be of very simple design or configuration and/or can be small. Thus, for example, a movable input body comprising one of the objects can be connected to the marker element, while the more complex elements, in particular sensor and magnetic field element, are connected to the immovable object.

In a preferred embodiment, the 3D input apparatus has at least two or at least three or at least six or exactly six of the sensor units described above.

In a preferred embodiment, the magnetoresistive sensor is a one-dimensional sensor with a single sensor direction. The sensor detects movements on both sides along said sensor direction. If the 3D input apparatus has several sensors, it is preferred that each of said sensors is designed as described above. In a preferred embodiment, the magnetoresistive sensor is an AMR sensor or a GMR sensor or a CMR sensor or a TMR sensor. If the 3D input apparatus has several sensors, it is preferred that all sensors correspond to one of said sensor types, wherein it is also possible that a combination of different sensor types is implemented. Each sensor unit, in particular the sensor for each sensor unit, is preferably configured such that the distance of the marker element and/or the magnetic element to the sensor is detected. Preferably, the distance is only detected along one sensor direction. Thus, the distance is only measured along one direction, but preferably not along the directions perpendicular thereto.

In a preferred embodiment, the 3D input apparatus comprises an input body and a fixed body. Here, the input body comprises the first or the second object, in particular consists thereof, while the fixed body comprises the other object, in particular consists thereof. It is preferred that the input body is arranged at least partially inside the fixed body. Preferably, the fixed body is relatively immovably connected or connectable to an object such as a table, a mobile device, a computer, a remote control or a controller. It is preferred that the input body can be deflected on one or both sides by a user, in particular along the three displacements and/or the three angular rotations, relative to the fixed body.

In a preferred embodiment, the input body is cylindrical, hollow cylindrical, cuboidal, cube-shaped, cap-shaped, spherical, partially spherical or ellipsoidal. If the input body has a hollow cylindrical shape, it is preferred that an opening extending through the input body is provided, which can be acted upon by external interactions. It is particularly preferred that the opening has substantially the diameter of a human finger, so that the input body can be acted upon by a finger inserted into the opening. It is preferred that the input body is configured to act on one or both sides. Acting on both sides means, for example, to act on the input body by means of the thumb and index finger of a hand on opposite sides of the input body. It is preferred that the input body comprises at least one acting surface. The acting surface preferably concave or convex.

Preferably, the 3D input apparatus comprises at least one magnet. The magnet in particular comprises the magnetic field element, in particular consists thereof. If the 3D input apparatus has several magnetic field elements, it is preferred that several of said magnetic field elements are formed by one magnet, wherein it is particularly preferred that all magnetic field elements are formed together by a single magnet. For example, it is possible that the magnet is star-shaped and that each star tip of the magnet corresponds to a magnetic field element. The magnet is preferably a permanent magnet. It is also possible that the magnet is an electromagnet, in particular a coil. When the magnet is designed as an electromagnet, it is preferred that the electromagnet is designed to emit a variable magnetic field. If the electromagnet has a coil, for example, it is preferred that variable voltages can be applied. The variable electromagnet makes it possible to implement a feedback, for example a force feedback, and/or a magnetic bearing of the 3D input apparatus by cooperating with the corresponding marker element(s).

In a preferred embodiment, the 3D input apparatus comprises at least one, preferably ferromagnetic, marker. The marker preferably comprises the marker element, in particular consists thereof. If the 3D input apparatus has several marker elements, it is preferred that several marker elements, in particular all marker elements, are formed by a single marker.

It is preferred that for each sensor unit the marker element of said sensor unit is substantially parallel to the magnetization direction of the magnet of said sensor unit. In this context, magnetization direction means in particular a connecting line between the north and south poles of the magnet. In a preferred embodiment, for each sensor unit, the marker element of said sensor unit is substantially perpendicular to the sensor direction of the sensor of said sensor unit. It is preferred that for each sensor unit, the marker element of said sensor unit is substantially coaxial with the sensor of said sensor unit. The above positional relationship relates with respect to the marker element and/or the sensor unit preferably to a longitudinal axis thereof, in particular with a preferred elongated embodiment of the respective element. In a preferred embodiment, for each sensor unit, the marker element of said sensor unit is substantially perpendicular to the sensor direction of the sensor of said sensor unit.

In a preferred embodiment, the 3D input apparatus comprises a first group and a second group of at least three, in particular exactly three, sensor units each. The sensor directions of the sensors of the first group and/or the sensors of the second group are substantially parallel to each other. Alternatively or additionally, it is preferred that the sensor directions of the sensors of the first group and/or the second group are in a single plane. It is particularly preferred that the sensor directions of the sensors of one group are parallel to each other, while the sensor directions of the sensors of the other group are in a single plane.

In a preferred embodiment, the sensor directions of the sensors of the first group are substantially perpendicular to the sensor directions of the sensors of the second group.

In a preferred embodiment, the sensor units of the first group and/or the sensor units of the second group are arranged on a circumference, in particular at the same angular distance from each other. It is particularly preferred that the sensor units of the first group and/or the sensor units of the second group each have an angular distance of 120°.

In particular, all sensor units of the 3D input apparatus are arranged on a circumference with the same angular distance, in particular of 60°, from each other.

If the 3D input apparatus has several sensor units, it is preferred that all sensor units are arranged on a circumference and/or all sensors are arranged on a circumference and/or all marker elements are arranged on a circumference and/or all magnetic field elements are arranged on a circumference. Here, it is preferred that the same elements on a circumference have the same angular distance from each other, in particular 60°.

In a preferred embodiment, the 3D input apparatus comprises at least one movement restricting device. In particular, the movement restricting device is configured to be elastic. It is preferred that the movement restricting device comprises at least one spring and/or at least one elastomer, for example an elastic mat. Preferably, the movement restricting device comprises at least one, e.g. rigid, stopper. In particular, the stopper is, for example rigidly, connected to the first or the second object. In particular, the at least one spring is designed as a torsion spring and/or tension spring and/or compression spring. The movement restricting device restricts the movement between the first and the second object. It is preferred that the movement restricting device, preferably the at least one spring, in particular after a relative movement, urges the first object relative to the second object to an initial position, also called rest position, or keeps it there. Preferably, the 3D input apparatus delivers the value 0 for all displacements and angular rotations in the rest position. In a preferred embodiment, the spring is low in hysteresis so that the range of the rest position can be selected to be small. Alternatively or in addition to the execution of the movement restricting device for causing an initial position, it is preferred that the movement restricting device, in particular the at least one stopper, restricts movements between the first and the second object in such a way that a working range of the sensor unit(s) cannot be left. In particular, for this purpose, the movement restricting device, preferably the at least one stopper, restricts movements between the first and the second object in such a way that the marker element of each sensor unit remains in a measuring range of the sensor of said sensor unit and/or in a magnetic field range of the magnetic field element of said sensor unit. It is possible that the movement restricting device directly or indirectly connects the first object and the second object.

In a preferred embodiment, the 3D input apparatus comprises a resilient flat element. The flat element is connected to the first or the second object so that a user can act on the object connected thereto, in particular the input body, by touching it via the flat element. It is preferred that the flat element at least partially covers the element connected thereto. The flat element preferably comprises a display and/or a film.

In a preferred embodiment, the 3D input apparatus comprises an evaluation apparatus and/or a power supply such as a battery.

In a preferred embodiment, the 3D input apparatus comprises at least one strap connected to the input body. In particular, the at least one strap is a finger strap so that a human finger can be used to act on the input body via the finger strap.

The mobile device according to the present invention is in particular a mobile phone or a tablet or a laptop or a navigation device. The mobile device comprises at least one 3D input apparatus according to the invention. It is preferred that the at least one 3D input apparatus is firmly connected, in particular integrally, to the mobile device. Preferably, the at least one 3D input apparatus is connected to the mobile device in a data and/or power transmitting manner. In particular, the at least one 3D input apparatus is at least partially embedded in the mobile device.

In a preferred embodiment, the processor of the mobile device comprises the evaluation apparatus of the at least one 3D input apparatus, in particular consists thereof.

It is preferred a battery, in particular a rechargeable battery, of the mobile device has the power supply of the 3D input apparatus, in particular consists thereof. Advantageously, the combination of mobile device and 3D input apparatus means that the standard processor in a mobile device and/or the standard battery in a mobile device can be used for evaluation and to supply power to the 3D input apparatus so that no additional elements are required for this purpose.

The 3D input device according to the invention is in particular a 3D mouse, also called SpaceMouse. The 3D input device comprises a 3D input apparatus according to the invention. The 3D input apparatus, in particular the fixed body of the 3D input apparatus, is configured to be connectable or connected to a data processing system. In particular, the data processing system is a computer, a tablet, a laptop or a smartphone. The connection between the 3D input apparatus and the data processing system is in particular data-transmitting and/or power-transmitting and/or structural. Provided that the 3D input apparatus is connected to the data processing system, it is preferred that there is an integral connection. Provided that the 3D input apparatus is connectable to a data processing system, it is preferred that this is done in a wire and/or wireless manner. It is particularly preferred that the 3D input apparatus comprises a cable connection and/or a wireless communication device. In particular, the wireless communication device comprises a WLAN and/or Bluetooth module.

BRIEF DESCRIPTION OF THE DRAWINGS

In the following, the invention is described in more detail by means of preferred embodiments with reference to the accompanying drawings.

The terms Fig., Figs., Figure, and Figures are used interchangeably in the specification to refer to the corresponding figures in the drawings.

In the Figures:

Figure 1A:
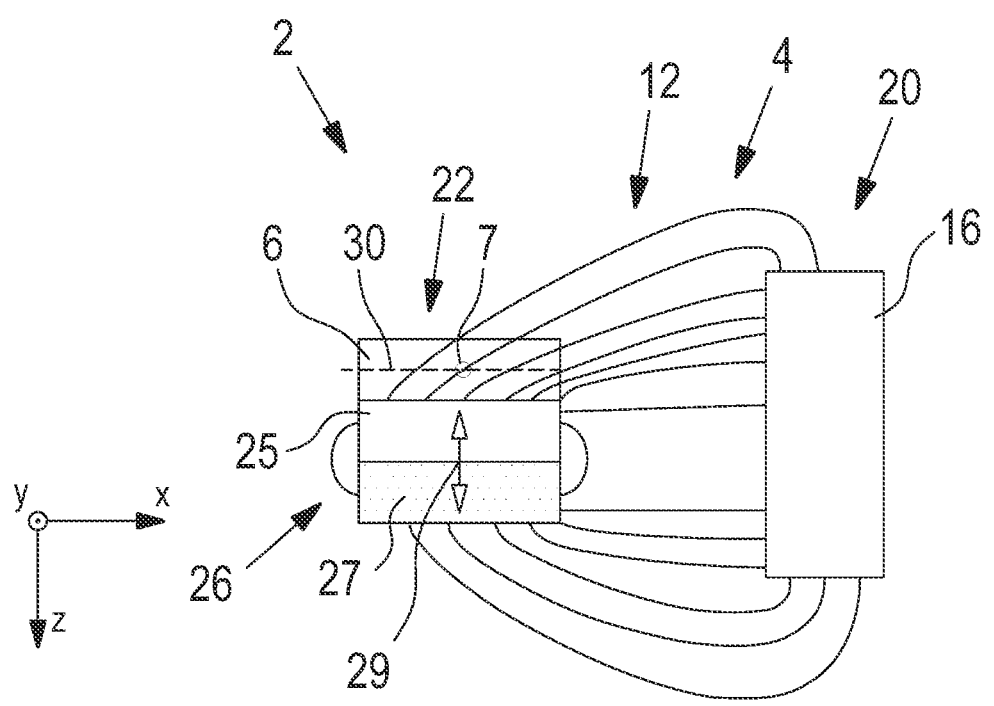
Figure 1B:
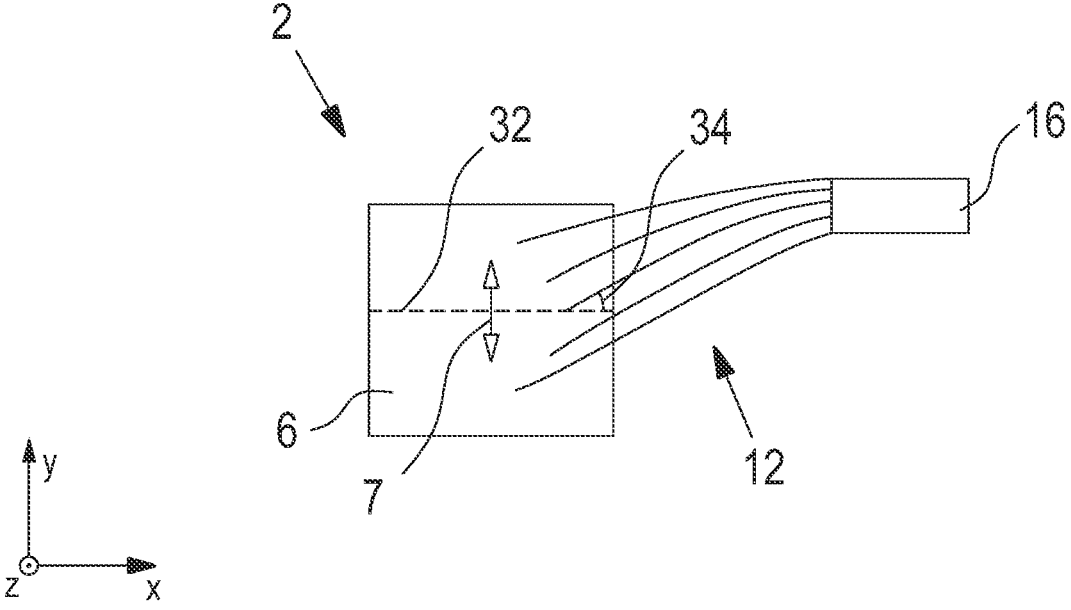
Figure 6A:
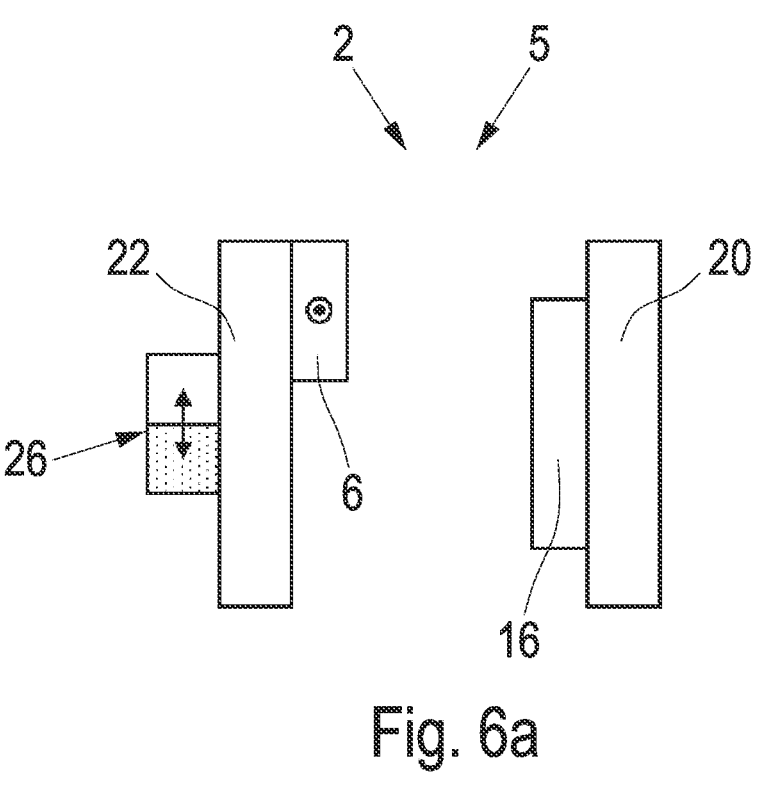
Figure 6B:
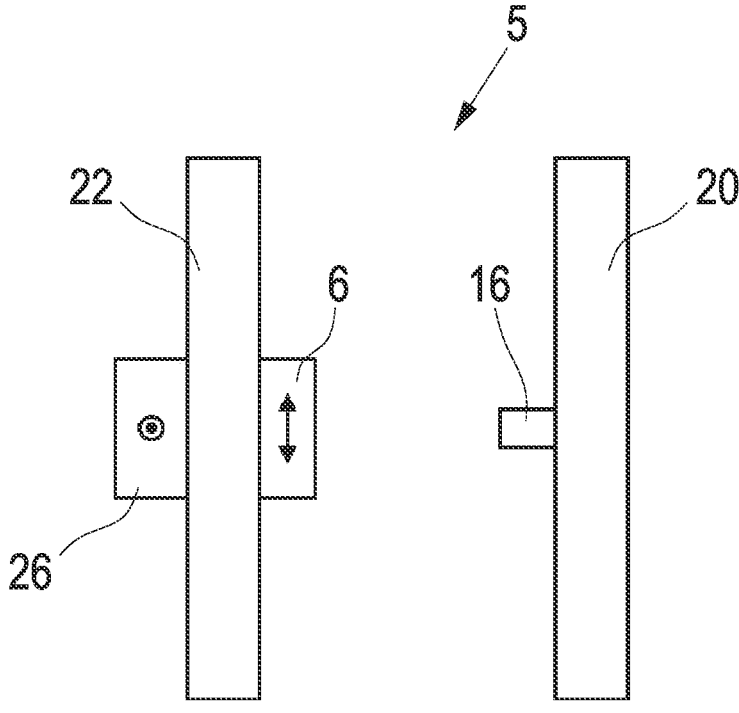
Figures 7A, 7B, 7C:
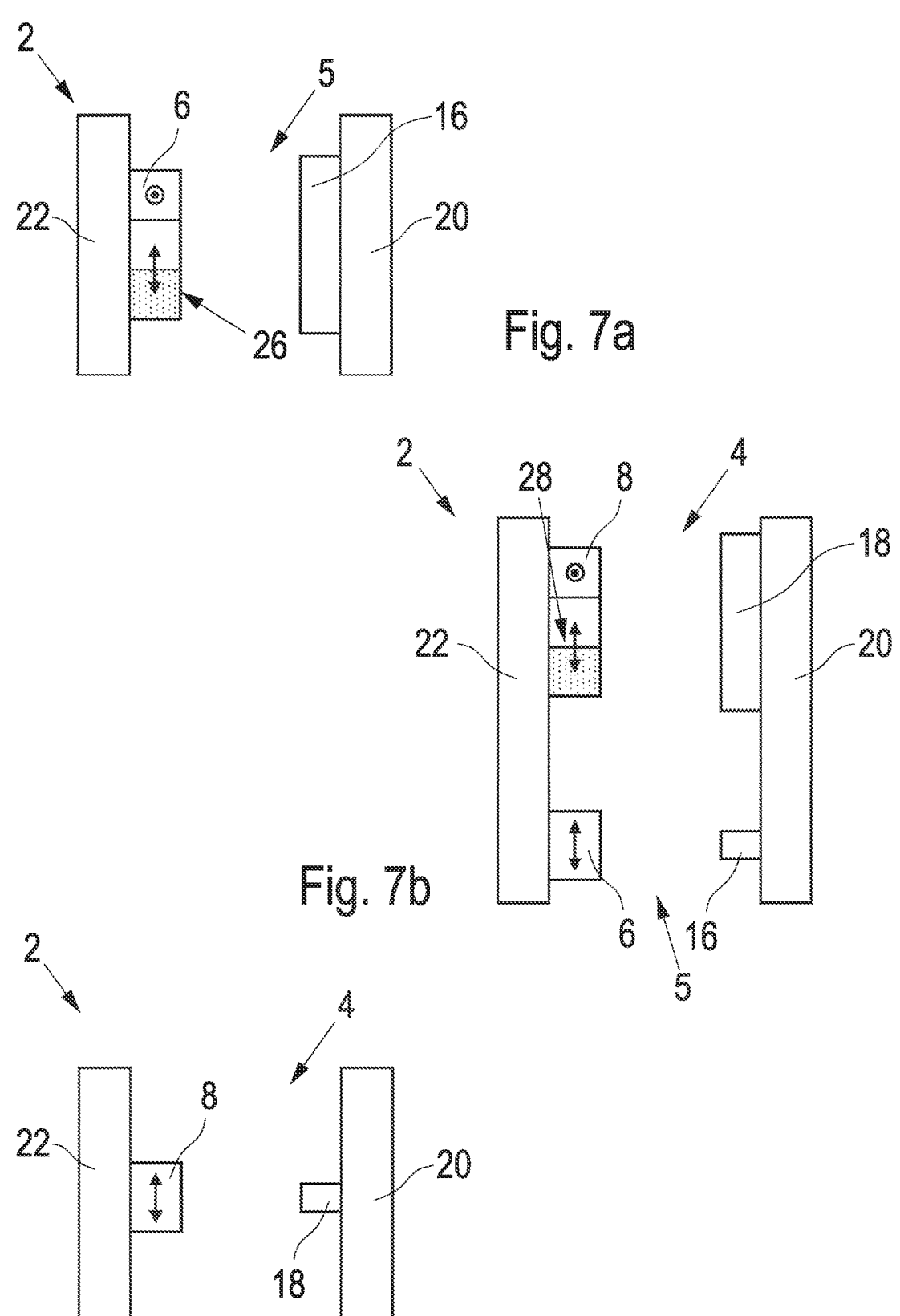
Figure 8:
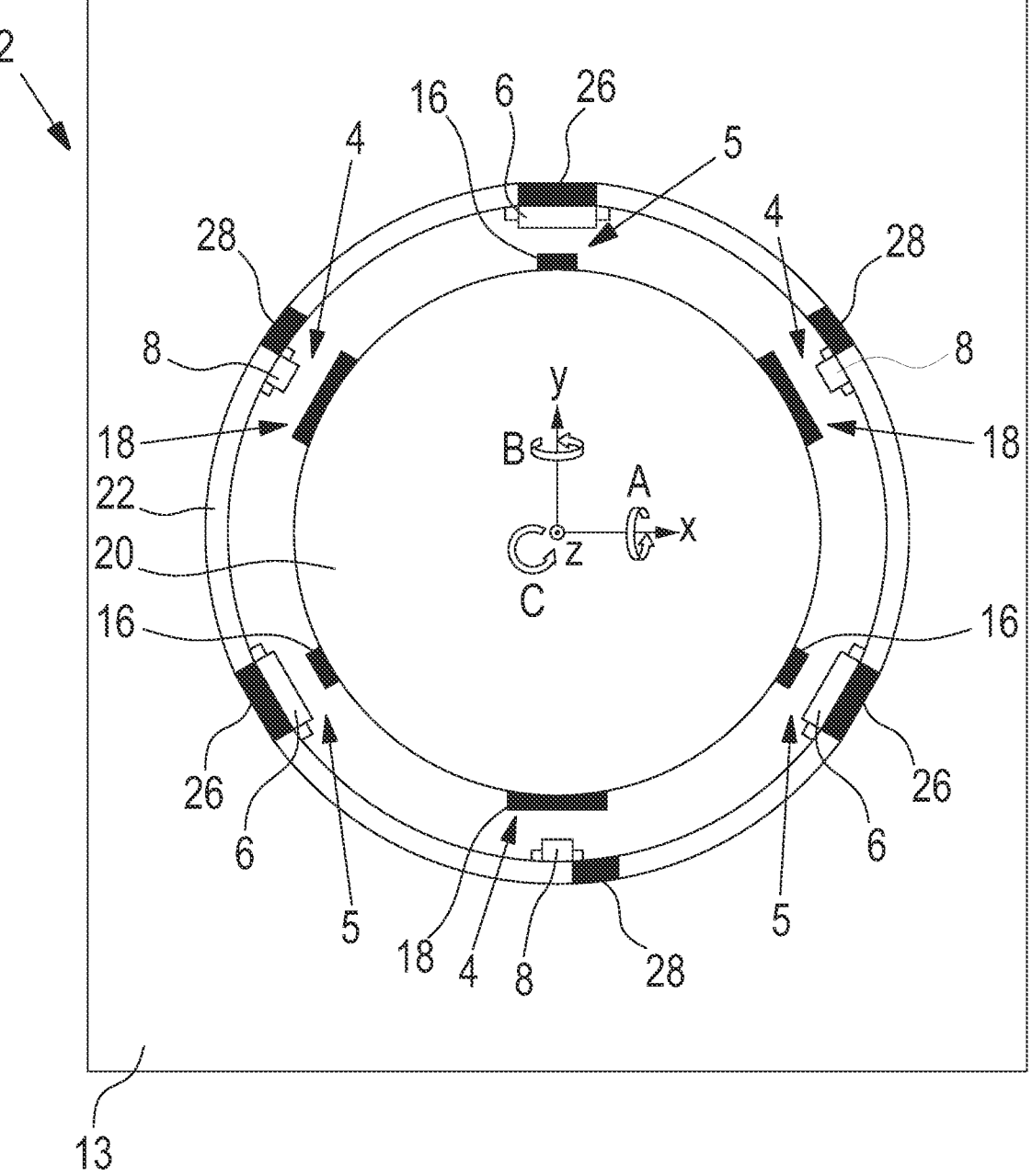
Figure 12:
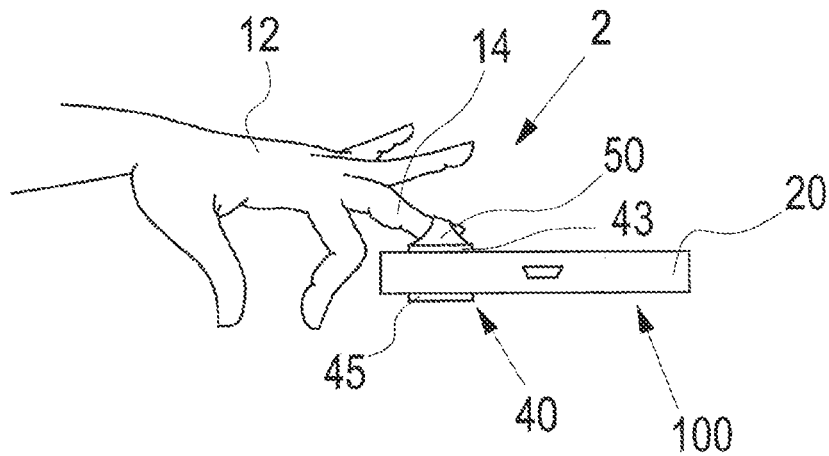
Figure 13:
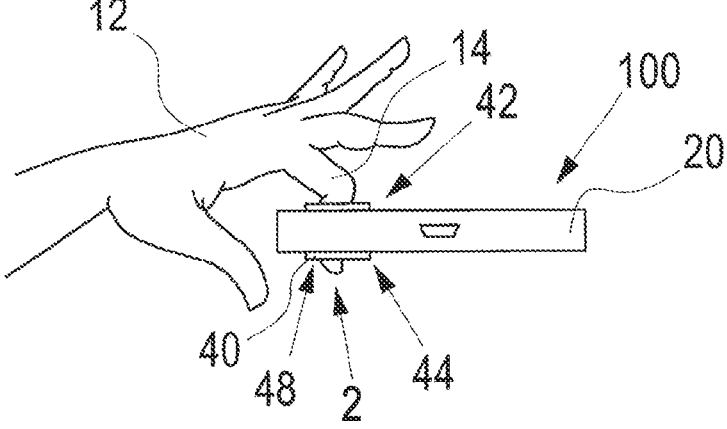
Figure 14:
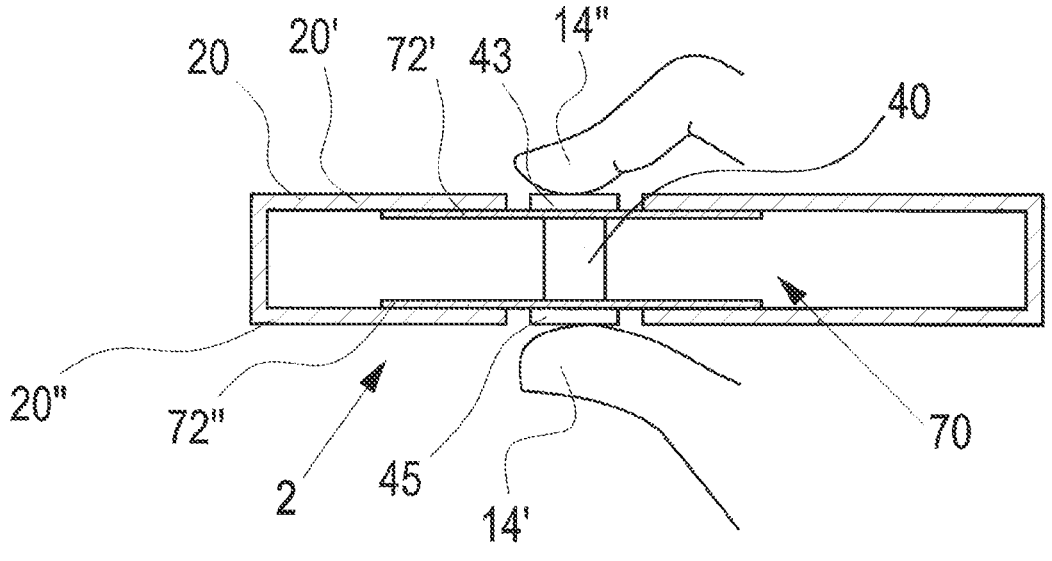
Figure 15:
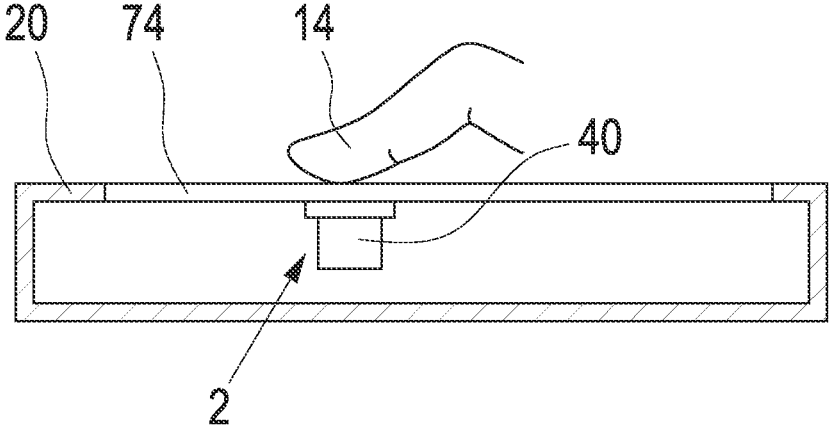
Figure 16:
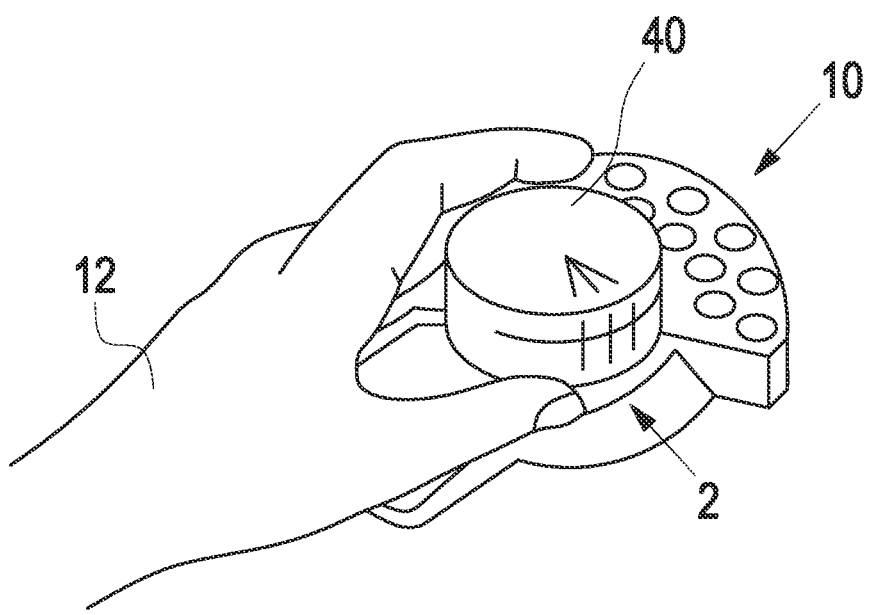
Figure 17:
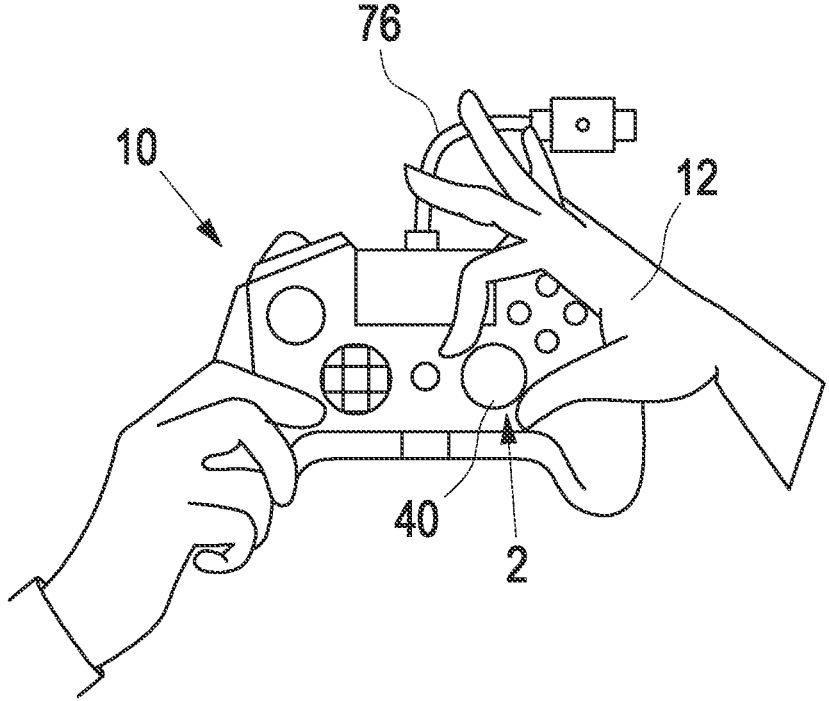

FIG. 1a is a schematic side view of an embodiment of a 3D input apparatus according to the invention in a first condition, FIG. 1b is a schematic plan view of the 3D input apparatus of FIG. 1a in a second condition, FIGS. 2a-2h are schematic plan views of the 3D input apparatus of FIG. 1a in different conditions, FIGS. 3a-7a are schematic side views of further embodiments of the 3D input apparatus according to the invention, FIGS. 3b-7b are a schematic plan view of the 3D input apparatus of FIGS. 3a-7a, FIG. 7c is a schematic, rearward side view of the 3D input apparatus of FIG. 7a, FIG. 8 is a schematic plan view of a further embodiment of the 3D input apparatus according to the invention, FIGS. 9a-9c are different schematic views of an embodiment of a mobile device according to the invention with a further embodiment of a 3D input apparatus according to the invention, FIGS. 10-13 are schematic side views of embodiments of a mobile device according to the invention with further embodiments of a 3D input apparatus according to the invention, FIGS. 14-15 are schematic sectional side views of further embodiments of a mobile device according to the invention with further embodiments of a 3D input apparatus according to the invention, and FIGS. 16-17 are schematic perspective views of embodiments of a 3D input device according to the invention with further embodiments of a 3D input apparatus according to the invention.

DESCRIPTION OF THE INVENTION

In the Figures, similar or identical components or elements are identified by the same reference numerals or variations thereof (e.g. 14, 14' and 14"). In particular in the interest of improved clarity, preferably elements already identified are not provided with reference numerals in all Figures.

FIG. 1a is a side view of an embodiment of a 3D input apparatus 2.

The 3D input apparatus 2 comprises a sensor unit 4 having a magnetic field element 26, a sensor 6 connected, in particular rigidly, to magnetic field 26, and a marker element 16 arranged opposite thereto and movable relative thereto.

The illustrated magnetic field 26 is preferably a magnet having two poles 25, 27 and a magnetization direction (illustrated by arrow 29). Magnetic field element 26 generates a magnetic field having magnetic field lines 12.

Magnetic marker element 16, which in particular has ferromagnetic material, attracts the magnetic field lines 12 and influences them due to the magnetic, in particular ferromagnetic, property. Marker element 16 focuses the magnetic field lines 12. Depending on the position of marker element 16, the course of the magnetic field lines 12 is thus changed (see for example FIG. 1b).

The magnetoresistive sensor 6 detects the magnetic field lines 12, in particular the change in the magnetic field lines 12. In particular, sensor 6 is located between magnetic field element 26 and marker element 16. Preferably, sensor 6 measures angle 34 (see FIG. 1b) of the magnetic field lines 12, in particular in the center of sensor 6, relative to a reference line 32 (see FIG. 1b). In particular, the direction of the magnetic field lines 12 is only detected in a measuring plane 30, which here is located in particular in the xy-plane, of sensor 6. Preferably, only changes along the y-axis are detected. Particularly preferably, vertical components, in particular along the x-axis and the z-axis, are not detected. The resulting sensor direction of sensor 6 is illustrated with arrow 7. It should be noted that this is a bilateral sensor direction 7 so that detection takes place in positive and negative y-axis direction.

As illustrated, marker element 16 corresponds to a first object 20 and sensor 6 with magnetic field element 26 corresponds to a second object 22. The sensor unit 4, the first object 20 and the second object 22 thus together correspond to an embodiment of a 3D input apparatus 2.

FIG. 1b shows a plan view of the 3D input apparatus 2 of FIG. 1a with the marker element moved from an initial position (see FIG. 1a) in the positive y-direction.

The movement of marker element 16 changed the magnetic field lines 12, in particular directing them in the positive Y-direction. This change in the magnetic field 12 is detected by sensor 6 as an angle 34 with respect to reference line 32.

FIGS. 2a-2h show a plan view of further conditions of the 3D input apparatus 2 of FIG. 1a and FIG. 1b.

Figure 2A:
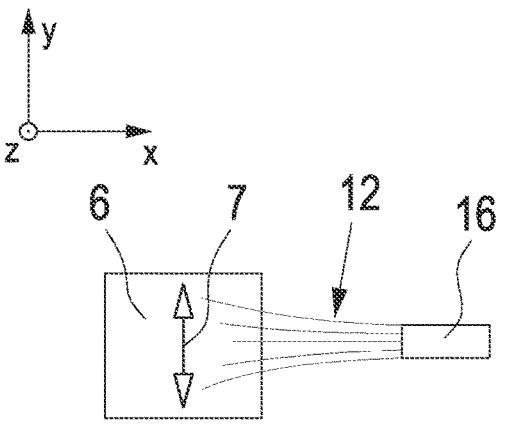

FIG. 2a shows the initial position corresponding to the position of FIG. 1a.

Figure 2E:
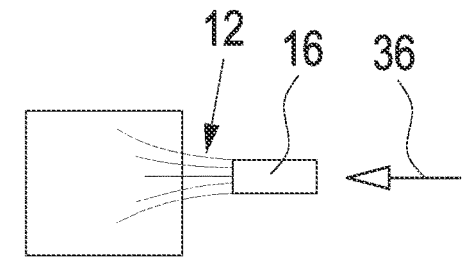
Figure 2B:
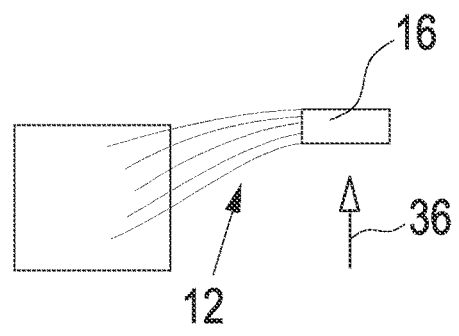
Figure 2F:
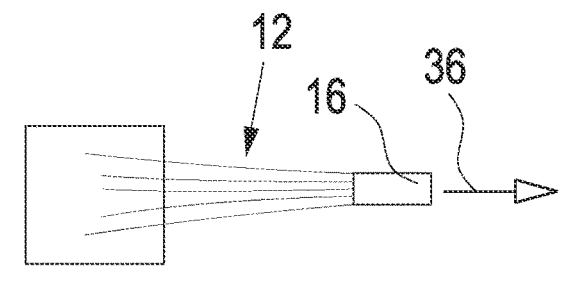
Figure 2C:
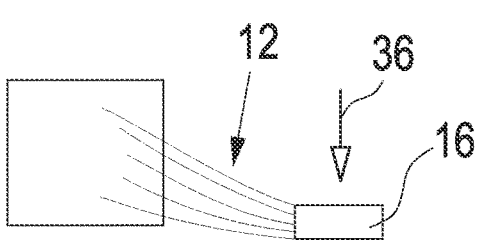

FIGS. 2b and 2c show positive (FIG. 2b) and negative (FIG. 2c) relative movements in the y-direction between marker element 16 and sensor 6. The movement is exemplarily illustrated by arrow 36. The magnetic field lines 12 are changes accordingly.

Figure 2G:
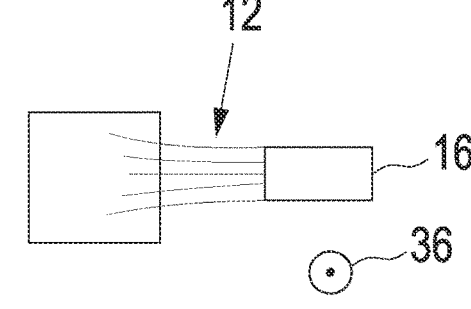
Figure 2D:
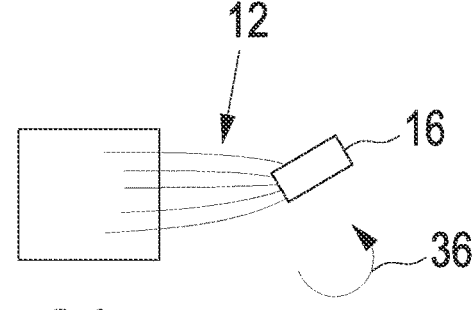

FIG. 2d shows a rotation of marker element 36, in particular in the direction of arrow 36 about the z-axis. As illustrated, it is a rotation of about 30°, for example. Instead of moving marker element 16, a corresponding movement of sensor 6 and magnetic field element 26 is also possible. The orientation of the magnetic field lines 12 substantially does not change from the initial position so that no movement is detected. This is particularly because there is no movement along sensor direction 7. In other words, the field lines 12 maintain their direction in sensor 6 when marker element 16 is rotated. It is possible, for example, that the entry points of the field lines 12 at marker element 16 change slightly, but they are not measured at this point.

FIGS. 2e and 2f show negative (FIG. 2e) and positive (FIG. 2f) movements of marker element 16 relative to sensor 6 in the x-direction, illustrated by arrow 36. Here, too, there is no movement detection by sensor 6.

Figure 2H:
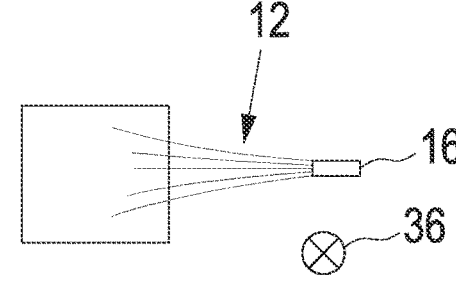

FIGS. 2g and 2h show positive (FIG. 2g) and negative (FIG. 2h) relative movements between marker element 16 and sensor 6 in the z-direction according to arrow 36. Once again, no movement is detected by sensor 6 or no change in the magnetic field lines 12.

Figure 3A:
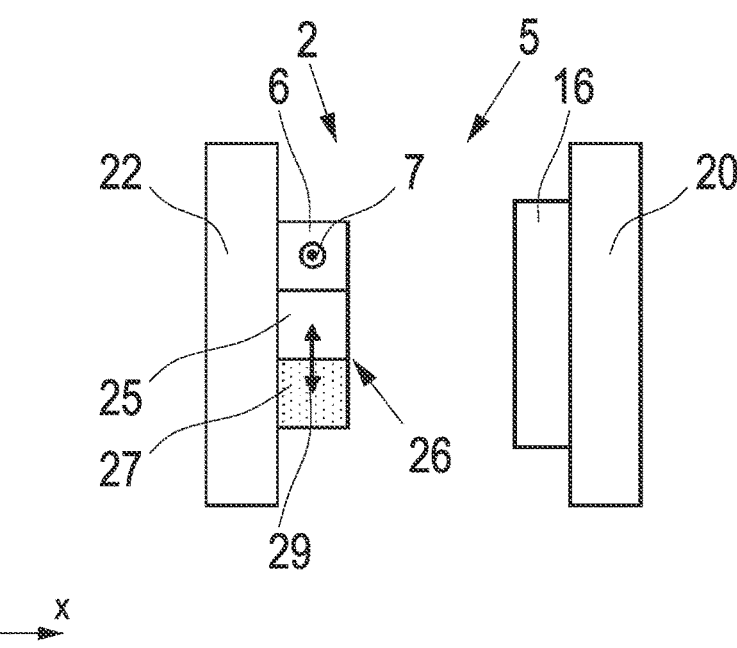

FIG. 3a shows a side view of a further embodiment of a 3D input apparatus 2. This embodiment is substantially based on the embodiment in FIG. 1a.

Sensor 6 with sensor direction 7 is connected, in particular rigidly, to a second object 22. Magnetic field element 26 is also connected, in particular rigidly, to the second object 22. It is possible that sensor 6 and magnetic field element 26 are connected to each other as illustrated, but it is also possible, for example, that sensor 6 and magnetic field element 26 are spaced apart.

A first object 20 is arranged so that it can move relative to the second object 22 and is connected, in particular rigidly, to marker element 16.

Sensor 6, marker element 16 and magnetic field element 26 form sensor unit 5. Based on the configuration in FIG. 1a, the magnetic field generated by magnetic field element 26 is influenced by marker element 16 and correspondingly detected by sensor 6.

Figure 3B:
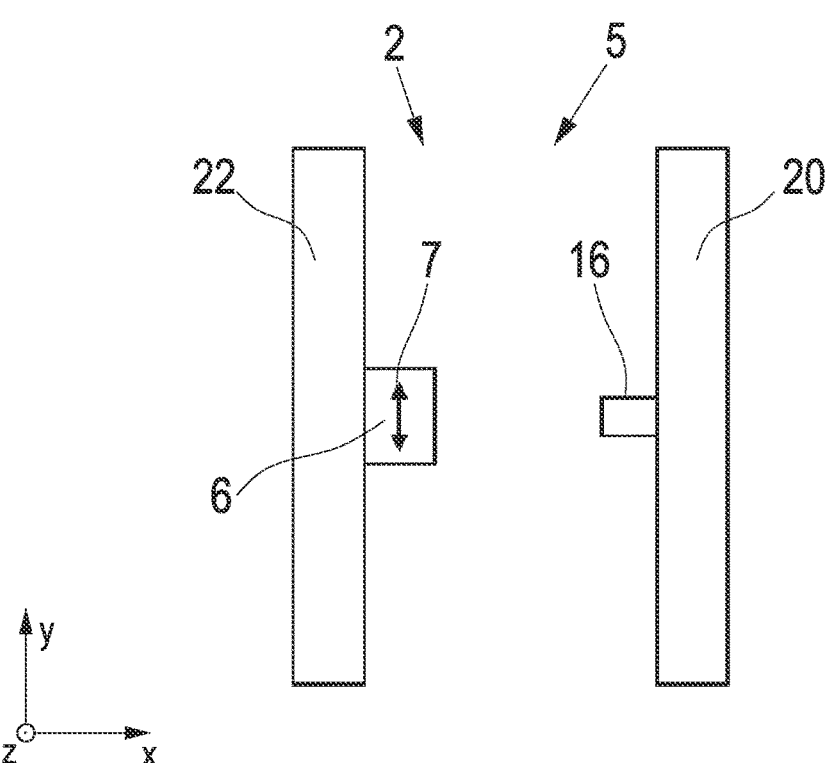

FIG. 3b shows a plan view of the 3D input apparatus 2 of FIG. 3a. Here, it can be seen that marker element 16 is of elongated design.

Figure 4A:
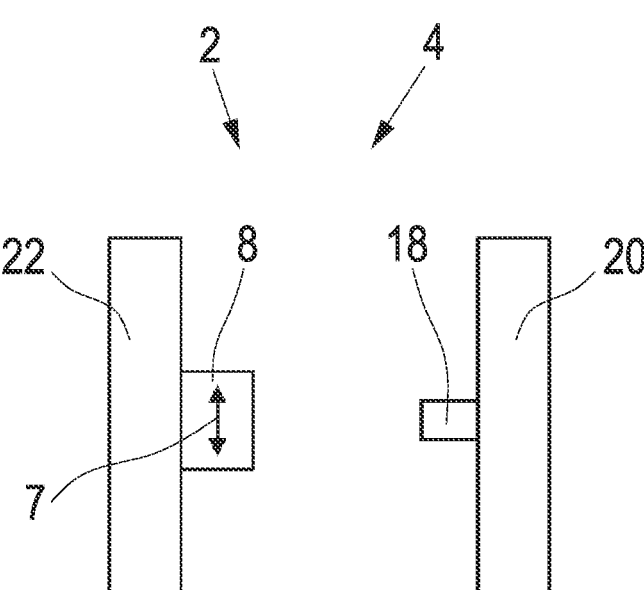
Figure 4B:
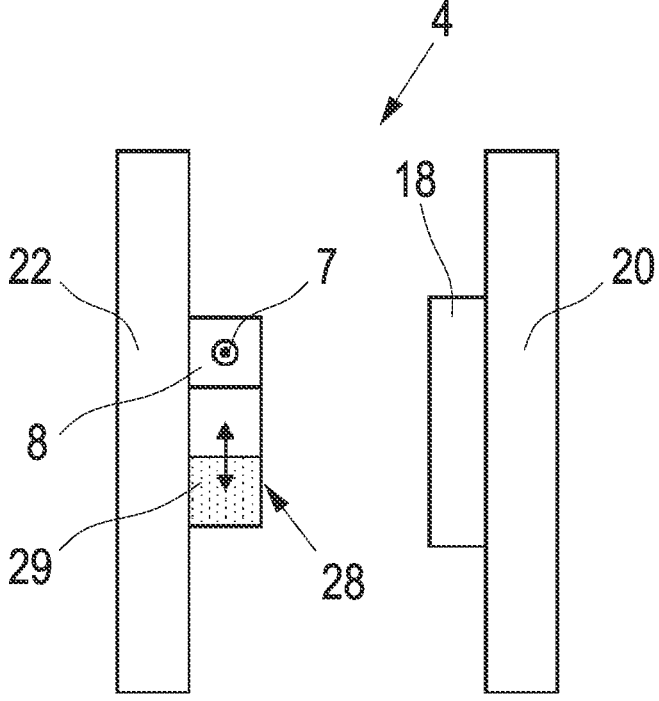

FIG. 4a is a schematic plan view of a further embodiment of a 3D input apparatus 2, wherein FIG. 4b is a plan view of the 3D input apparatus 2.

The illustrated sensor unit 4 here substantially differs from sensor unit 5 in FIG. 3a in that sensor 8 and magnetic field element 28 and these two together are arranged perpendicular to sensor 6 and magnetic field element 26 of FIG. 3a. Similarly, the elongated marker element 18 of FIG. 4a is perpendicular to marker element 16 of FIG. 3a.

In contrast to the embodiment of FIG. 3a, the embodiment of 3D input apparatus 2 of FIG. 4a is not able to detect a relative movement between the objects 20, 22 in the y-direction, but relative movements of the objects 20, 22 in the z-direction.

Figure 5A:
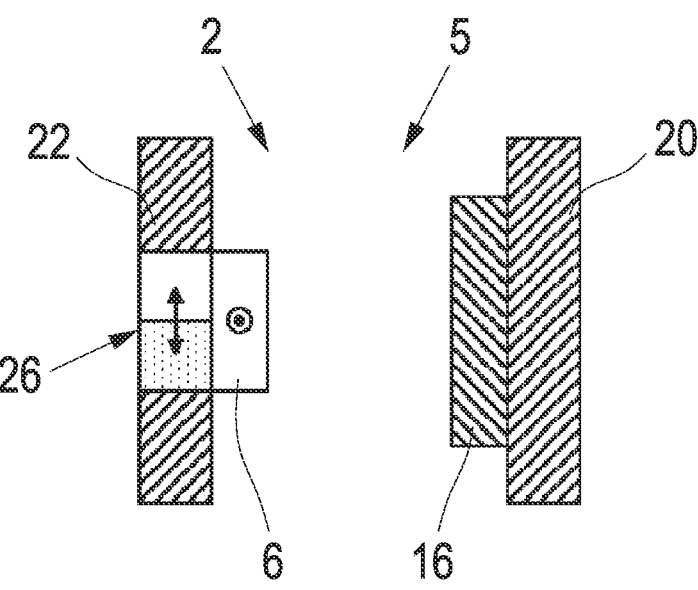
Figure 5B:
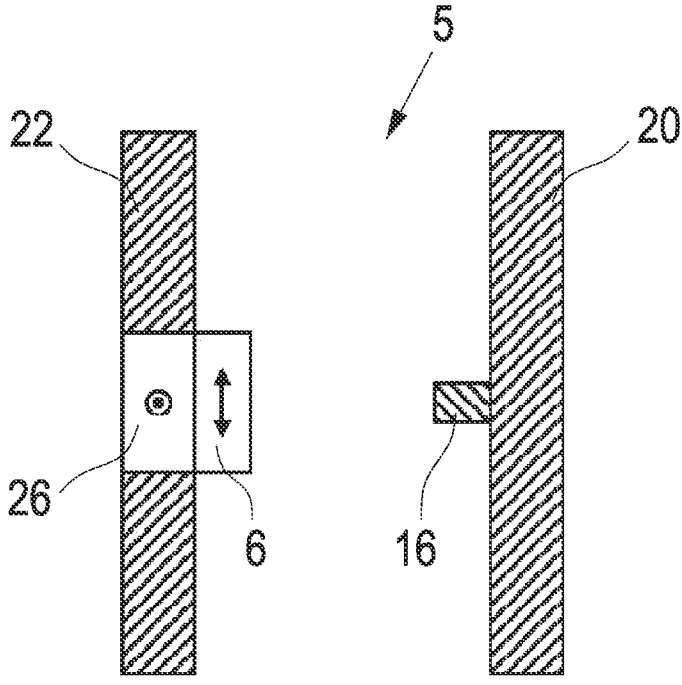

FIG. 5a shows a further embodiment of a 3D input apparatus in plan view, wherein FIG. 5b shows the side view of said 3D input apparatus 2. The illustrations in FIGS. 5a and 5b are sectional views.

In contrast to the embodiment of FIG. 3a, magnetic field element 26 is arranged inside the second object 22. For example, magnetic field element 26 can be embedded in the second object 22, in particular in a borehole. Sensor 6 is arranged on the front side of magnetic field element 26 or the second object 22, respectively.

FIG. 6a shows a further embodiment of a 3D input apparatus in plan view, wherein FIG. 6b shows a side view. Here, magnetic field element 26 and sensor 6 are connected, in particular rigidly, to the second object 22 on opposite sides. Preferably, a height offset between magnetic field element 26 and sensor 6 is also provided.

FIGS. 7a-7c show further embodiments of a 3D input apparatus 2. FIG. 7a shows a side view, wherein FIG. 7c shows a rearward side view, i.e. approximately a view of the rear of FIG. 7a. FIG. 7b shows a plan view.

The 3D input apparatus 2 of FIGS. 7a-7c comprises two sensor units 4, 5. Substantially, these are sensor unit 4 of FIG. 3a and sensor unit 5 of FIG. 4a. They are respectively connected, in particular rigidly, to the first object 20 and the second object 22. In this embodiment, a relative movement along the y-axis between the first object 20 and the second object 22 can be detected by sensor unit 5 and along the z-axis by sensor unit 4.

FIG. 8 shows a further embodiment of a 3D input apparatus 2 in plan view.

Here, the first object 20 is arranged or configured to be movable relative to the second object 22. As illustrated, the second object 22 is preferably connected, in particular rigidly, to carrier plate 13 so that the first object 20, for example, is adapted be moved relative to the second object 22. This is also possible in the reverse direction. The first object is preferably movable along the three axes as well as about the three axes as in the illustrated coordinate system.

The 3D input apparatus comprises six sensor units 4, 5.

The three sensor units 4 are designed in the same way as in FIG. 4a, but with magnetic field elements 28 embedded in the second object 22 and sensors 8 offset therefrom. The sensor units 4 thus each detected a relative movement between the first object 20 and second object 22 along the z-axis.

The sensor units 5, on the other hand, are designed approximately in the same way as in FIG. 3a, but with the magnetic field elements 26 embedded in the second object 22 and the sensors 6 arranged in front of them. The sensor units 5 detect relative movements between the first object 20 and the second object 22 in the xy-direction or the xy-plane, respectively. The sensor unit 5 shown above detects relative movements along the Y-axis, for example.

Taken together, the various relative movements detected can thus be used to detect an overall relative movement along the three axes and about the three axes of the Cartesian coordinate system between the first object 20 and the second object 22.

As illustrated, the sensor units 4, which form a first group of sensor units 4, are each offset by 120° from one another. The same applies to the sensor units 5, which form a second group of sensor units 5. All sensor units 4, 5 are consequently arranged offset to each other by 60°.

It is also possible, for example, for one sensor unit 4 and one sensor unit 5 to be arranged substantially congruently in the z-direction, so that there is no angular offset between them, but all sensor units 4 or all sensor units 5 are still offset by 120° from each other.

FIG. 9a shown a plan view of a mobile device 100 according to the invention having a 3D input apparatus 2 according to the invention. In particular, mobile device 100 is a mobile phone, for example a smartphone. On the lower side, mobile phone 100 has a bore 22 through housing 20 of mobile phone 100. A fully cylindrical input body 40 is arranged inside bore 22, of which the first surface 43 on the first side 42 of the input body 40 can be seen in FIG. 9a. The (non-illustrated) sensors 6, 8 and the (nonillustrated) magnetic field elements 26, 28 of the 3D input apparatus 2 are in particular arranged directly on the inwardly facing bore surface of bore 22 of housing 20. The (non-illustrated) marker elements 16, 18 are located in particular on the shell surface of the cylindrical shape of input body 40.

FIG. 9b shows a rear view of mobile device 100 of FIG. 9a. Here, the second surface 45 on the second side 44 of input body 40 can be seen.

FIG. 9c shows a side view of mobile device 100 of FIGS. 9a and 9b which is the lower side of the mobile phone. Here, it can be seen that the two areas on the first side 42 and the second side 44 of input body 40 are not flush with the contour of housing 20 of mobile device 100. Two areas of input body 40, with the first surface 43 and the second surface 45, thus protrude from housing 20. Alternatively, a flush closure is also possible.

Figure 10:
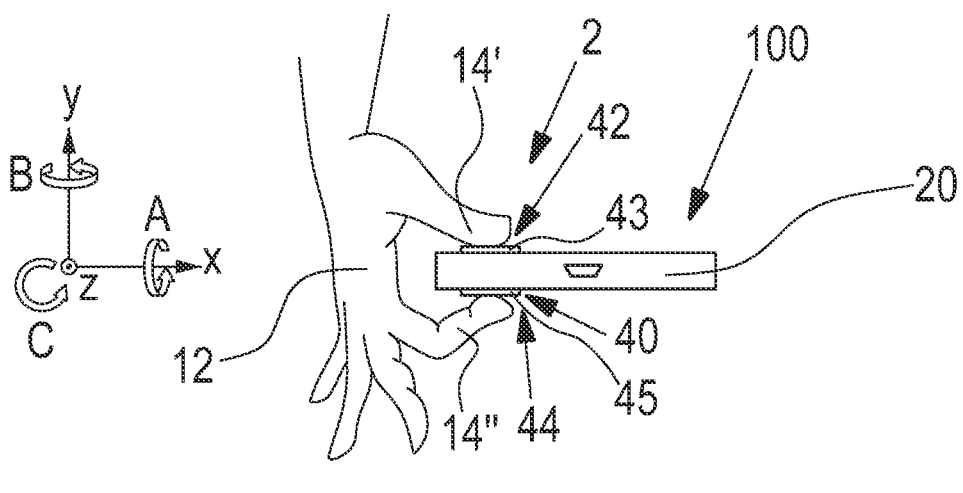

FIG. 10 shows mobile device 100 of FIGS. 9a-9c with hand 12 of a user. Thumb 14' and index finger 14" of hand 12 rest on the one hand on the first surface 43 and on the other hand on the second surface 45 of input body 40. By means of such gripping of input body 40 by hand 12 of a user, the user can deflect input body 40 relative to housing 20. For example, if the user moves both fingers in the same direction along a plane perpendicular to the drawing plane, input body 40 performs a displacement along X, Y, Z relative to housing 20. For example, if the user moves both fingers 14', 14" out of the drawing plane with input body 40 gripped perpendicular to the drawing plane, input body 40 performs a displacement along the Z-axis (illustrated coordinate system), with the Z-axis perpendicular to the drawing plane. For example, if the user moves thumb 14' perpendicular to the drawing plane out of the drawing plane (in the Z-direction) and moves index finger 14" perpendicular to the drawing plane into the drawing plane (against the Z-direction), input body 40 performs an angular rotation A about the X-axis. When the user performs an equidirectional rotation of the two fingers 14', 14" tangential to the cylindrical input body 40, input body 40 performs an angular rotation B about the Y-axis. Such movements of the input body can be combined to perform a movement, in particular a simultaneous movement, of input body 40 relative to housing 20 in such a way. Such detected movements via the 3D input apparatus 2 can then be used as input commands, for example.

Figure 11:
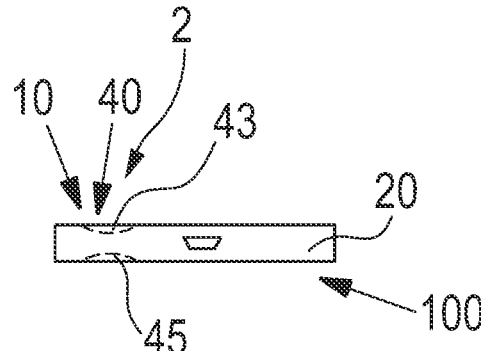

FIG. 11 shows a further embodiment of a mobile device 100 according to the invention having the 3D input apparatus 2 according to the invention. Instead of the embodiment of input body 40 of FIG. 10, in which input body 40 protrudes from housing 20, input body 40 of FIG. 4 closes flush with housing 20. Here, input body 40 has a fully cylindrical shape, wherein the first surface 43, which corresponds to the base surface of the cylindrical shape, has a trough shape, also to be referred to as a concave surface 43. The second surface 45 opposite said surface 43 is also concave. In contrast to the illustrated embodiment, a combination of concave, convex or planar embodiments for the first surface 43 and the second surface 45 is also possible. It is also possible that input body 40 does not protrude beyond housing 20 and also does not close flush with housing 20, but is arranged completely inside housing 20.

FIG. 12 shows a further embodiment of a mobile device 100 according to the invention having the 3D input apparatus 2 according to the invention. The illustrated embodiment substantially corresponds to the embodiment of FIG. 10, with a strap 50, in particular designed as a finger strap, being arranged on the first surface 43. Said strap 50 is connected to the first surface 43 of the input body 40. In this way, a user can engage the strap 50 with one or more fingers 14 and thus achieve deflection of input body 40 along the six components without accessing both the first surface 43 and the second surface 45.

FIG. 13 shows a further embodiment of a mobile device 100 according to the invention having the 3D input apparatus 2 according to the invention. In contrast to the above embodiments, input body 40 does not have a fully cylindrical shape, but a hollow cylindrical shape. A user can thus reach into and/or through input body 40 with one or more fingers 14. With regard to the embodiment of FIG. 12, it is again possible to cause a deflection of the input body along the six components on only one side and/or with only one finger. In doing so, the user's finger 14 engages the shell surface of the hollow cylinder of input body 40. The diameter of the hole of the hollow cylinder of input body 40 substantially corresponds to the finger diameter of a human being, so that the closest possible contact of the hollow cylinder to the finger is ensured.

FIG. 14 shows a further embodiment of a mobile device 100 according to the invention having the 3D input apparatus 2 according to the invention. Input body 40 is supported by a movement restricting device 70, which has two elastic mats 72', 72". The elastic mats 72', 72" are each firmly connected to both housing 20 and input body 40. Said firm connections prevent the elastic mats 72', 72" from slipping. The elasticity of the elastic mats 72', 72" is preferably present only between housing 20 and input body 40. A deformation of the elastic mats 72', 72" due to the action of a user causes a restoring force that seeks to return input body 40 to the rest position. Preferably, the elastic mats 72', 72' are hysteresis-free or low-hysteresis mats such that input body 40 returns to the rest position. Instead of the illustrated embodiment in which the elastic mats 72', 72" are arranged inside housing 20 on the housing walls 20' and 20", it is also possible that the elastic mats 72', 72" are arranged on the outer sides of the housing walls 20', 20" of housing 20. It is also possible to arrange the mats 72', 72" inside the bore, flush with housing 20 towards the outside, so that a flush appearance without gaps between housing 20 and input body 40 is given. In addition to the spring function of the elastic mats 72', 72", they provide a closure or seal against external environmental influences, for example on the interior of mobile device 100.

FIG. 15 shows a further embodiment of a mobile device 100 according to the invention having the 3D input apparatus 2 according to the invention.

The 3D input apparatus 2, which is only illustrated schematically, comprises an input body 40 arranged inside housing 20 of mobile device 100. The input body 40 is connected to an elastic film, in particular an elastic display 74, for acting thereon. A user can thus act on the elastic display 74 and thus on input body 40 of the 3D input apparatus 2 by means fingers 14, for example, in order to generate a movement input.

FIG. 16 shows an embodiment of a 3D input device 10 according to the invention having the 3D input device 2 according to the invention.

The illustrated 3D input device 10 is a 3D mouse, in particular. The 3D input apparatus 2 is covered by input body 40, which is configured to be ellipsoidal here. A hand 12 of a user can make an input via input body 40, which can be detected by the 3D input apparatus 2 and transmitted, for example, in a wired and/or wireless manner to a data processing system that is not illustrated.

FIG. 17 shows a further embodiment of a 3D input device 10 according to the invention having the 3D input device 2 according to the invention.

In particular, the illustrated 3D input device 10 is a controller, preferably a 3D controller. The 3D input apparatus 2 is covered by input body 40, which is configured to be cap-shaped here. A hand 12 or at least one finger of a user can make an input via input body 40, which can be detected by the 3D input apparatus 2 and transmitted via cable 76 to a data processing system that is not illustrated. Instead of wired transmission via cable 76, wireless transmission, e.g. via Bluetooth and/or WLAN, is also possible as an alternative or in addition.

The invention claimed is:

1. A 3D input apparatus comprising:
a first object;
a second object movable relative to the first object; and
at least one sensor unit for detecting displacements and/or
    angular rotations of the objects relative to each other,
wherein each sensor unit comprises a magnetoresistive sensor, a magnetic field element, and a magnetic marker element,
wherein the magnetoresistive sensor and the magnetic field element of respectively one sensor unit are connected to the first object and the marker element of said sensor unit is connected to the second object, and
wherein for each sensor unit the magnetoresistive sensor of said sensor unit detects a magnetic field emitted by the magnetic field element of said sensor unit and influenced by the marker element of said sensor unit.

2. The 3D input apparatus according to claim 1, wherein the apparatus further comprises at least two, sensor and/or marker elements and/or magnetic field elements and/or sensor units.

3. The 3D input apparatus according to claim 2, wherein all sensor units and/or all magnetic field elements and/or all marker elements and/or all sensors are arranged on a circumference with a same angular distance from each other.

4. The 3D input apparatus according to claim 2, wherein all sensor units and/or all magnetic field elements and/or all marker elements and/or all sensors are arranged on a circumference with a same angular distance of 60° from each other.

5. The 3D input apparatus according to claim 1, wherein the magnetoresistive sensor is a one-dimensional sensor with a sensor direction.

6. The 3D input apparatus according to claim 1, further comprising:
an input body comprising the first or the second object; and
a fixed body comprising the other object,
wherein the input body is cylindrical, hollow cylindrical, cuboidal, cube-shaped, cap-shaped, spherical, partially spherical or ellipsoidal.

7. The 3D input apparatus according to claim 1, wherein each of the magnetic field elements or several magnetic field elements are formed by a magnet.

8. The 3D input apparatus according to claim 1, wherein each of the marker elements or several are formed together by a marker.

9. The 3D input apparatus according to claim 8, wherein each of the markers are ferromagnetic markers.

10. The 3D input apparatus according to claim 1, wherein for each sensor unit:
the marker element of said sensor unit is substantially parallel to the magnetization direction of the magnetic field element of said sensor unit;
the marker element of said sensor unit is substantially perpendicular to the sensor direction of the sensor of said sensor unit; and/or
the sensor direction of the sensor of said sensor unit is perpendicular to the magnetization direction of the magnetic field element of said sensor unit.

11. The 3D input apparatus according to claim 10, wherein the sensor directions of the sensors of a first group are substantially perpendicular to the sensor directions of the sensors of a second group.

12. The 3D input apparatus according to claim 1, wherein the apparatus further comprises a first group and a second group of at least three sensor units each, and wherein the sensor directions of the sensors of the first group are substantially parallel to each other and/or the sensor directions of the sensors of the second group are substantially parallel to each other.

13. The 3D input apparatus according to claim 1, wherein the apparatus further comprises a movement restricting device between the first object and the second object, and wherein the movement restricting device urges the first object relative to the second object into an initial position.

14. The 3D input apparatus according to claim 1, wherein the apparatus further comprises a resilient flat element, and wherein the flat element is connected to the first object or the second object so that a user can act on the object connected thereto by touching it via the flat element.

15. The 3D input apparatus according to claim 1, wherein the apparatus further comprises an evaluation apparatus and/or a power supply.

16. The 3D input apparatus according to claim 1, wherein the apparatus further comprises at least one strap, connected to the input body.

17. A mobile device comprising;
at least one 3D input apparatus according to claim 1,
wherein a processor of the mobile device comprises an evaluation apparatus of the 3D input apparatus and/or a battery of the mobile device comprises the power supply of the 3D input apparatus.

18. The 3D input device comprising:
a 3D input apparatus according to claim 1, wherein the 3D input apparatus is connectable or connected to a data processing system.

19. The 3D input apparatus according to claim 1, wherein each of the magnetic field elements or several magnetic field elements are formed by a permanent magnet or an electromagnet.

\* \* \* \* \*